(12) United States Patent
Paré et al.

(10) Patent No.: US 9,308,951 B2
(45) Date of Patent: Apr. 12, 2016

(54) TRACK SYSTEM WITH OVERLAPPING WHEEL TANDEM FRAMES

(71) Applicant: Soucy International Inc., Drummondville (CA)

(72) Inventors: Steeve Paré, St-Majorique (CA); William Gasse, Drummondville (CA); André Todd, Mont Saint-Hilaire (CA)

(73) Assignee: Soucy International Inc., Drummondville, Quebec (CA)

( * ) Notice: Subject to any disclaimer, the term of this patent is extended or adjusted under 35 U.S.C. 154(b) by 468 days.

(21) Appl. No.: 13/675,039

(22) Filed: Nov. 13, 2012

(65) Prior Publication Data

US 2013/0119753 A1   May 16, 2013

Related U.S. Application Data (60) Provisional application No. 61/559,290, filed on Nov. 14, 2011.

(51) Int. Cl.
| | |
|---|---|
| *B62D 55/14* | (2006.01) |
| *B62D 55/04* | (2006.01) |
| *B62D 55/065* | (2006.01) |
| *B62D 55/084* | (2006.01) |

(52) U.S. Cl.
CPC ............... *B62D 55/14* (2013.01); *B62D 55/04* (2013.01); *B62D 55/065* (2013.01); *B62D 55/084* (2013.01)

(58) Field of Classification Search
CPC ........ B62D 55/04; B62D 55/10; B62D 55/14; B62D 55/084; B60D 55/065
USPC ......... 305/111, 113, 124, 125, 127, 128, 129, 305/130, 131, 132, 133, 135, 142, 145, 184, 305/170, 199; 180/9, 9.21, 9.36
See application file for complete search history.

(56) References Cited

U.S. PATENT DOCUMENTS

| | | | | |
|---|---|---|---|---|
| 3,170,532 | A * | 2/1965 | Boppart, Jr. .................. | 180/164 |
| 3,826,325 | A * | 7/1974 | Purcell et al. ................. | 180/9.54 |
| 4,537,267 | A * | 8/1985 | Satzler ............................ | 180/9.1 |
| 5,373,909 | A * | 12/1994 | Dow et al. ...................... | 180/9.1 |
| 5,494,125 | A * | 2/1996 | Gustin et al. ................... | 180/9.1 |
| 5,531,282 | A * | 7/1996 | Jennen ............................ | 180/9.1 |
| 6,125,956 | A * | 10/2000 | Gignac ........................... | 180/9.1 |
| 6,249,994 | B1 * | 6/2001 | Oertley ............................ | 37/382 |

\* cited by examiner

*Primary Examiner* — S. Joseph Morano
*Assistant Examiner* — Jean Charleston
(74) *Attorney, Agent, or Firm* — Robert Brouillette; Brouillette & Partners (57) ABSTRACT

A track system configured to be mounted to a vehicle comprises a drive wheel, a frame assembly, front and rear idler wheels respectively pivotally mounted at the front and rear extremities of the track system, road wheels pivotally mounted along the length of the track system, between the front and rear idler wheels, and an endless traction band disposed about the drive wheel, the idler wheels and the road wheels. The idler wheels and the road wheels are pivotally mounted on tandem frames such that adjacent tandem frames are overlapping. The tandem frames are pivotally mounted to the frame assembly via longitudinally spaced pivoting points.

20 Claims, 10 Drawing Sheets

TRACK SYSTEM WITH OVERLAPPING WHEEL TANDEM FRAMES

CROSS-REFERENCE TO RELATED APPLICATIONS

The present patent application claims the benefits of priority of U.S. Provisional Patent Application No. 61/559,290, entitled "Track System with Overlapping Wheel Tandem Frames" and filed at the United States Patent and Trademark Office on Nov. 14, 2011, the content of which is incorporated herein by reference.

FIELD OF THE INVENTION

The present invention generally relates to track systems and traction assemblies used as wheel replacement for typically wheeled vehicles. More particularly, the present invention relates to track systems and traction assemblies for use on heavy vehicles such as, but not limited to, farming and agricultural vehicles (e.g. tractors, harvesters, etc.) and construction and industrial vehicles (e.g. excavators, combines, forestry equipments, etc.).

BACKGROUND OF THE INVENTION

Several normally wheeled vehicles and particularly heavy wheeled vehicles (e.g. farming tractors, front loaders, harvesters, etc.) often have their wheels replaced by track systems which use an endless traction band instead of a tire for propulsion. Vehicles equipped with track systems typically have improved floatation and traction, particularly when they are operated over soft terrains.

However, during operation, some components of the track systems, and more particularly the idler wheels and road wheels, can experience uneven load distribution. This is particularly true when the idler wheels and the road wheels are mounted in tandem on tandem frames.

Indeed, in such track systems, the resultant force from the traction band tension and the traction band friction can induce a torque around the tandem frame pivot, resulting in the rotation of the tandem frame thereabout. This rotation then generally causes the wheels located at one end of the tandem frame to move upwardly while causing the wheels located at the other end of the tandem frame to move downwardly, resulting in an increased load on the wheels which are urged downwardly. The rotation of the tandem frame can also cause the trailing portion of the track system to rise. This uneven load distribution can reduce the efficiency of the track system and even lead to premature failure thereof.

Furthermore, when the vehicle equipped with such track systems needs to frequently switch from moving in a forward direction to moving in a rearward direction, and vice-versa, there is often an unpleasant lag time before the track systems properly respond to the change in moving direction. This lag time is at least partially caused by the time it takes for the tandem frames to pivot back to their normal position and then to their new pivoted position. This lag time causes, among other things, unwanted delays in the operation of the vehicle.

Hence, there is a need for an improved track system which mitigates at least some shortcomings of prior art track systems.

SUMMARY OF THE INVENTION

A track system in accordance with the principles of the present invention generally mitigates at least some of the shortcomings of prior track systems by having the idler wheels and the road wheels mounted on overlapping tandem frames.

Hence, a track system in accordance with the principles of the present invention generally comprises a drive wheel configured to be mounted to an axle of a vehicle, a support frame (or support frame assembly) configured to be mounted to the vehicle, front and rear idler wheels, typically respectively mounted at the front and at the rear of the track system, road wheels, typically mounted longitudinally between the idler wheels, and an endless traction band disposed about the drive wheel, the idler wheels and the road wheels.

The idler wheels and the road wheels are pivotally mounted to tandem frames which are pivotally mounted to the support frame at longitudinally spaced apart pivoting points. The tandem frames allow the idler wheels and the road wheels to move or pivot with respect to the pivoting points, thereby allowing the traction band, and more particularly the lower run thereof, to generally follow the irregularities of the terrain over which the track system is operated.

In accordance with the principles of the present invention, adjacent tandem frames are overlapping, i.e. the tandem frames extend into one another. Due to the overlapping configuration of the tandem frames, the movements of the idler wheels and/or of the road wheels with respect to the pivoting points are limited.

In typical though non-limitative embodiments of a track system in accordance with the principles of the present invention, the diameter of the idler wheels is larger than the diameter of the road wheels. In such embodiments, when a tandem frame support both idler wheels and road wheels, the longitudinal distance between the rotation axis of the idler wheels and the rotation axis of the pivoting point of the tandem frame is typically smaller than the longitudinal distance between the rotation axis of the road wheels and the rotation axis of the pivoting point of the tandem frame. When a tandem frame supports only road wheels, the longitudinal distances between the rotation axes of the road wheels and the rotation axis of the pivoting point of the tandem frame is typically substantially equal.

In typical though non-limitative embodiments of a track system in accordance with the principles of the present invention, the rotation axes of the pivoting points of the tandem frames which respectively support the front and rear idler wheels are respectively located longitudinally in front of and behind the rotation axis of the drive wheel.

In some non-limitative embodiments of a track system in accordance with the principles of the present invention, at least some of the road wheels are pivotally mounted to at least one tandem sub-frame, the at least one tandem sub-frame being pivotally mounted to one of the tandem frames.

A track system in accordance with the principles of the present invention generally improves the load distributions between the idler wheels and the road wheels, and/or generally decreases the tendency of the pivoting point located behind the rotation axis of the drive wheel to move upwardly when the vehicle moves forwardly, and vice-versa, and/or generally reduces the lag time when the vehicle moving in a forward direction switches to move in a rearward direction, and vice-versa.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel track system with overlapping wheel tandem frames will be described hereinafter. Although the invention is described in terms of specific illustrative embodiments, it is to be understood that the embodiments described herein are by way of example only and that the scope of the invention is not intended to be limited thereby.

Figure 1:
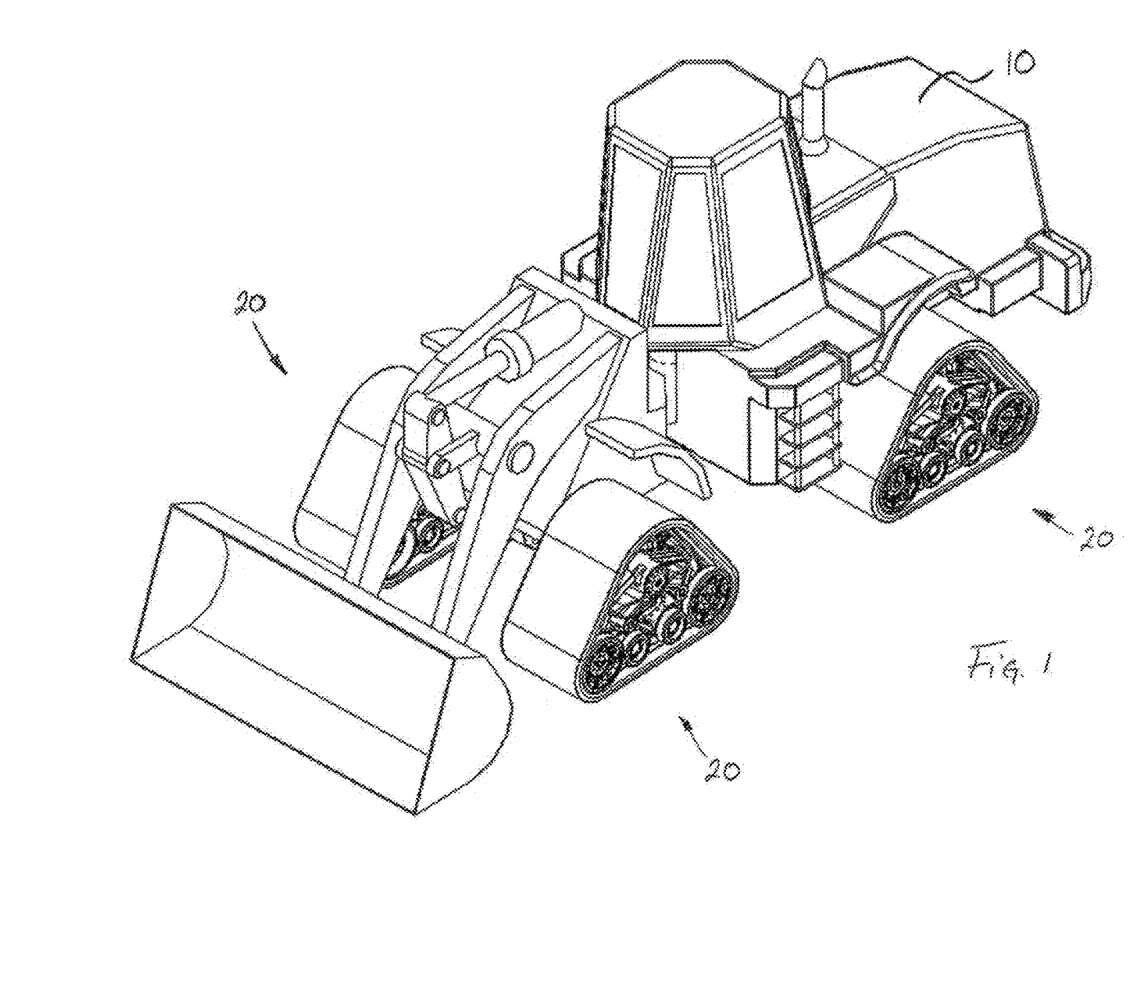
FIG. 1 is a perspective view of a vehicle having mounted thereto four track systems in accordance with the principles to the present invention.

Referring first to FIG. 1, four track systems 20 made in accordance to the principles of the present invention are shown mounted to a vehicle 10. In FIG. 1, the vehicle 10 is a front-loader typically used in construction. Notably, in FIG. 1, the track systems 20 are used to replace the wheels which are typically used on such vehicle 10.

In FIG. 1, all four track systems 20 are identical though the left and right track systems 20 are mirror image of each other. Still, the front and rear track systems 20 could be different depending, among other things, on the configuration of the vehicle 10. For instance, some farming vehicles (e.g. tractors) sometimes use smaller front track systems and larger rear track systems.

Figure 2:
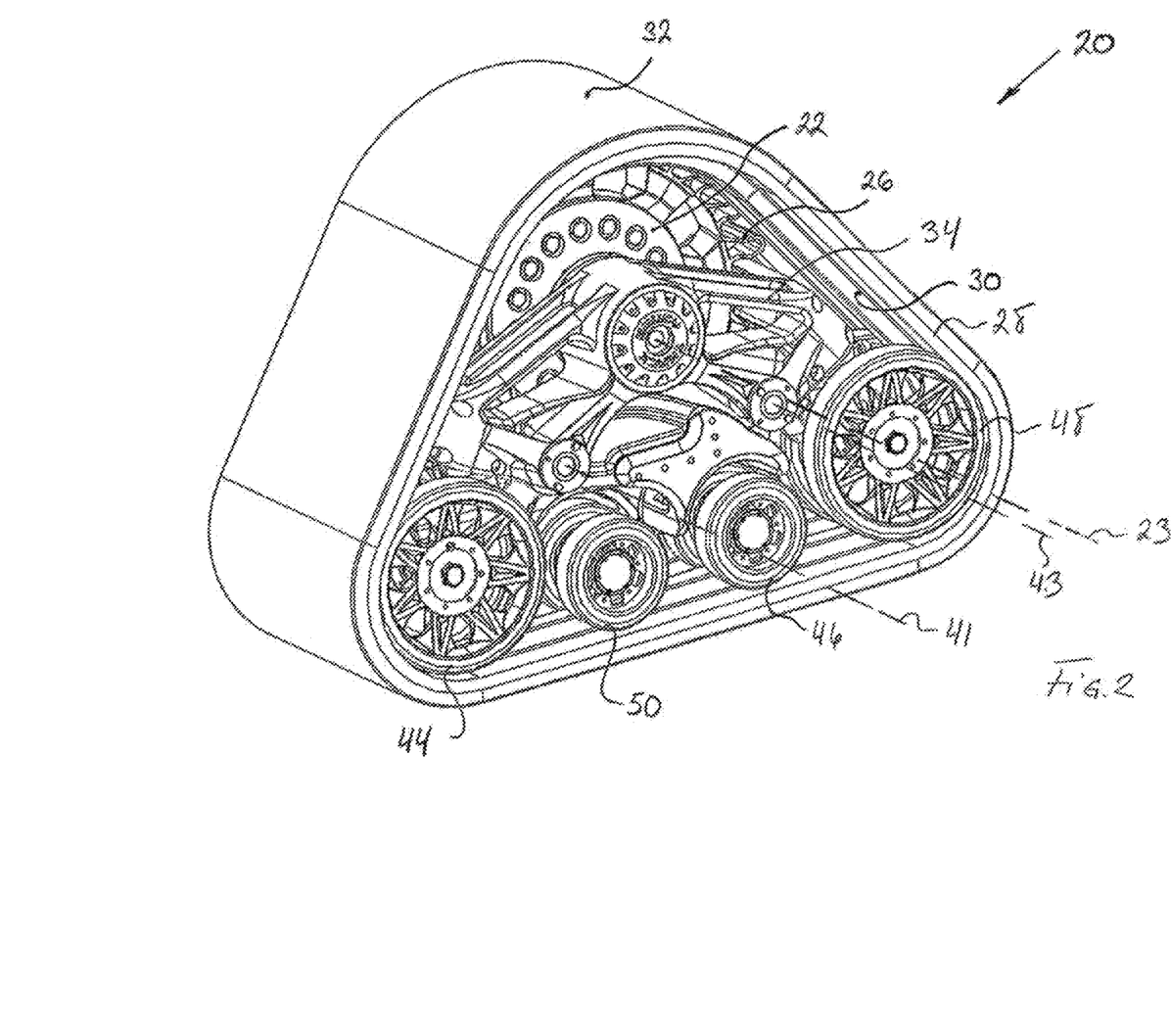
FIG. 2 is a perspective view of one of the track system of FIG. 1.
Figure 3A:
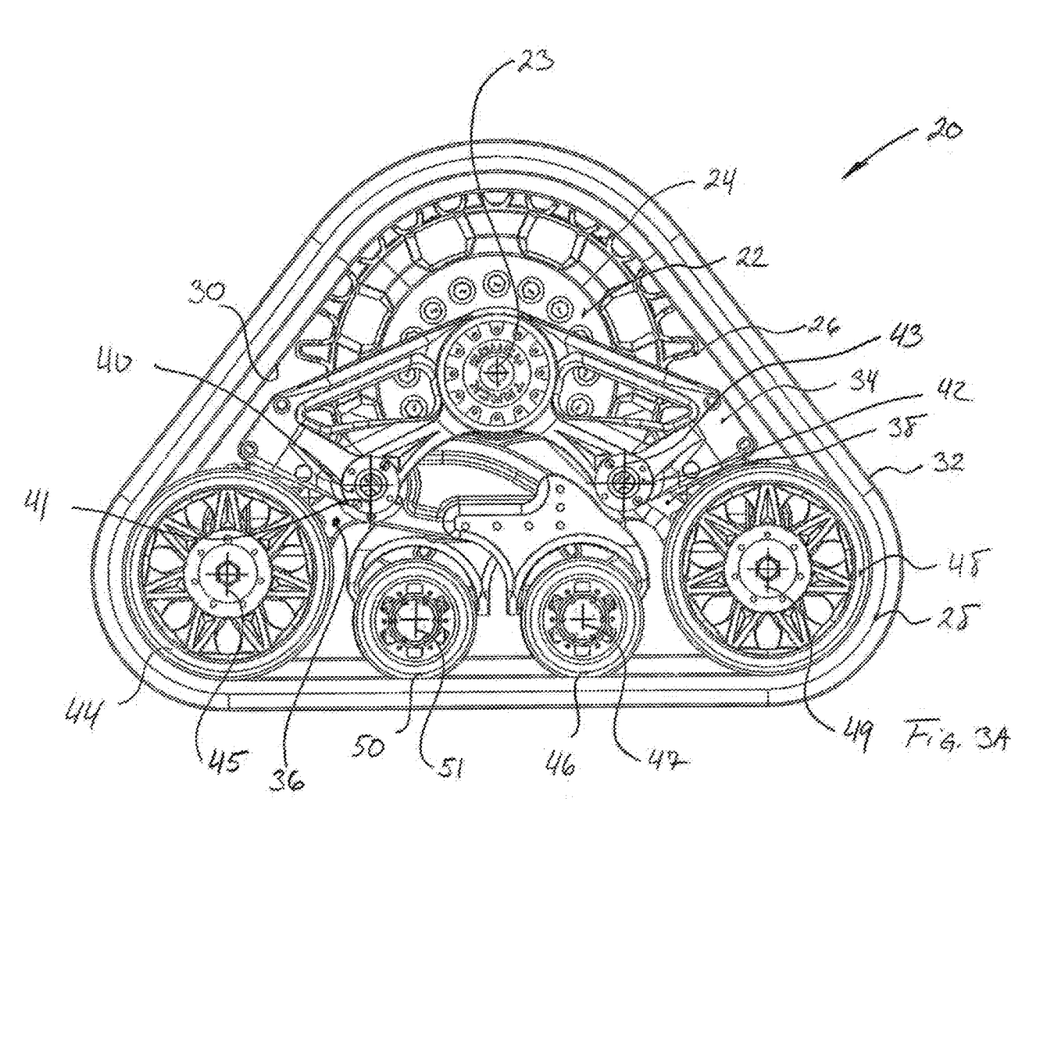
FIG. 3A is a side view of the track system of FIG. 2.

Referring now to FIGS. 2 and 3A, one of the four track systems 20 is shown in greater details.

In the present embodiment, the track system 20 comprises a drive wheel 22 configured to be mounted to the axle (not shown) of the vehicle 10. The drive wheel 22 defines a rotation axis 23 about which it rotates. The drive wheel 22 comprises, along its periphery 24, a plurality of evenly disposed sprocket teeth 26 configured to engage drive lugs (not shown) located on the inner surface 30 of the traction band 28. In the present embodiment, the drive wheel 22 is a sprocket wheel.

Figure 7:
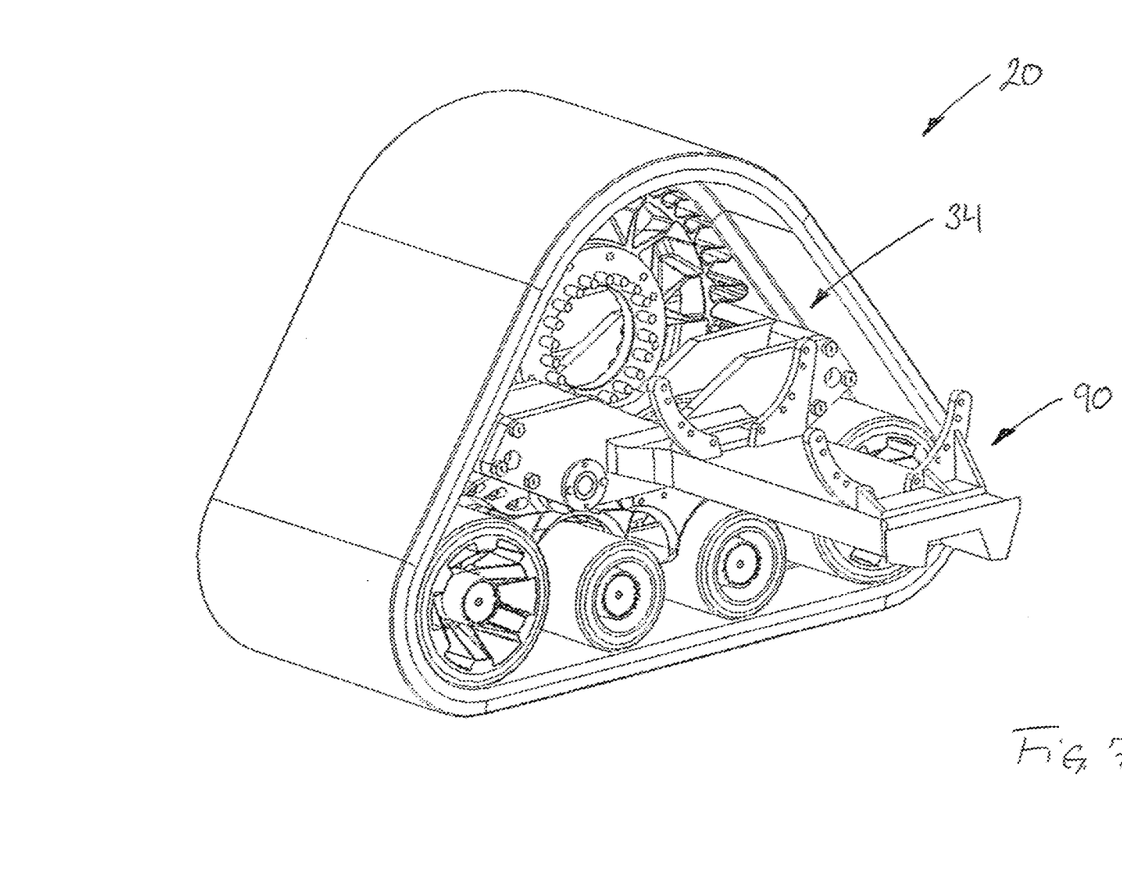
FIG. 7 is a perspective view of a variant of the track system of FIG. 2, viewed from the inboard side.

The track system 20 also comprises a frame assembly 34 pivotally mounted to the drive wheel 22. Understandably, though the frame assembly 34 can pivot with respect to the drive wheel 22, the frame assembly 34 does not rotate with the drive wheel 22 as the frame assembly 34 is not drivingly engaged to the drive wheel 22. Though in the present embodiment, the frame assembly 34 is pivotally mounted to the drive wheel 22, in other embodiments, such as the one shown in FIG. 7, the frame assembly 34 could be configured to be mounted directly to the vehicle 10, typically to its frame. In such embodiments, the frame assembly 34 would typically comprise an attachment frame or assembly 90 configured to secure the frame assembly 34 to the vehicle 10.

In the present embodiment, the frame assembly 34 pivotally supports two tandem frames 36 and 38. The front tandem frame 36 is pivotally mounted to the frame assembly 34 at front pivoting point 40 while the rear tandem frame 38 is pivotally mounted at rear pivoting point 42.

The front pivoting point 40 defines a rotation axis 41 while the rear pivoting point 42 defines a rotation axis 43. As best shown in FIG. 3A, in the present embodiment, the rotation axis 41 is located longitudinally in front of the drive wheel rotation axis 23 while the rotation axis 43 is located longitudinally behind the drive wheel rotation axis 23.

In the present embodiment, the longitudinal distance between the rotation axis 41 and the drive wheel rotation axis 23 is substantially equal to the longitudinal distance between the rotation axis 43 and the drive wheel rotation axis 23. In other embodiments, these two distances could be different.

Referring back to FIGS. 2 and 3A, in the present embodiment, the front tandem frame 36 pivotally supports front idler wheels 44 and rear road wheels 46. In a substantially symmetrical fashion, the rear tandem frame 38 pivotally supports rear idler wheels 48 and front road wheels 50.

The track system 20 also comprises the traction band 28, already introduced above, which is disposed about the drive wheel 22, the idler wheels 44 and 48 and the road wheels 46 and 50. The traction band 28 is typically made from reinforced elastomeric material and comprises an inner wheel-engaging surface 30 and an outer ground-engaging surface 32.

Though not shown in the figures, the inner surface 30 of the traction band 28 typically comprises one or more rows of longitudinally aligned drive lugs and/or one or more rows of longitudinally aligned guide lugs (collectively referred to as "inner lugs"). The drive lugs are configured to be drivingly engaged by the sprocket teeth 26 of the drive wheel 22.

In other embodiments, the inner surface 30 of the traction band 28 could only comprises guide lugs, and thus be devoid of drive lugs, such as to be frictionally engaged by the drive wheel 22 instead of being positively engaged thereby.

Though not shown in the figures, the outer surface 32 of the traction band 28 typically comprises traction lugs configured to engage the terrain over which the track system 20 is operated.

Referring now more particularly to FIG. 3A, the front pivoting point 40 allows the front tandem frame 36 to pivot thereabout, allowing the front idler wheels 44 and the rear road wheels 46 to move substantially vertically in opposite directions (e.g. upwardly and downwardly). Similarly, the rear pivoting point 42 allows the rear tandem frame 38 to pivot thereabout, allowing the rear idler wheels 48 and the front road wheels 50 to move substantially vertically in opposite directions (e.g. upwardly and downwardly). The ability of the idler wheels 44 and 48 and of the road wheels 46 and 50 to move substantially vertically as the tandem frames 36 and 38 pivot allows the lower run of the traction band 28, i.e. the portion of the traction band 28 which generally engages the ground, to substantially follow the irregularities of the terrain over which the track system 20 is operated.

Still referring to FIG. 3A, in the present embodiment, the diameter of the idler wheels 44 and 48 is larger than the diameter of the road wheels 46 and 50. Having larger idler wheels 44 and 48 generally allows the track system 20 to more easily overcome obstacles and also to overcome larger obstacles. Larger idler wheels also generally reduce rolling resistance as it is easier to bend an elastomeric traction band around larger idler wheels than around smaller idler wheels.

In addition, in the present embodiment, the longitudinal distance between the rotation axis 45 of the front idler wheels 44 and the rotation axis 41 of the front pivoting point 40 is smaller than the longitudinal distance between the rotation axis 47 of the rear road wheels 46 and the rotation axis 41 of the front pivoting point 40. Similarly, the longitudinal distance between the rotation axis 49 of the rear idler wheels 48 and the rotation axis 43 of the rear pivoting point 42 is smaller than the longitudinal distance between the rotation axis 51 of the front road wheels 50 and the rotation axis 43 of the rear pivoting point 42.

As already mentioned above, the diameter of the idler wheels 44 and 48 is larger than the diameter of the road wheels 46 and 50. The present combination of the different longitudinal distances between the rotation axes and of the different wheel diameters generally allows a more balance load distribution between the larger idler wheels 44 and 48 and the smaller road wheels 46 and 50. Indeed, due to their smaller diameter, the smaller road wheels 46 and 50 have a load bearing capacity which is generally inferior to the load bearing capacity of the larger diameter idler wheels 44 and 48. Hence, to prevent the road wheels 46 and 50 from sinking excessively into the inner surface 30 of the elastomeric traction band 28, it is preferable to more evenly balance the load transmitted to and/or supported by the idler wheels 44 and 48 and by the road wheels 46 and 50 during operation of the track system 20.

Typically, the load bearing capacity of a wheel will be generally proportional to its diameter. Hence, a wheel with a diameter twice as large as the diameter of another wheel would be able to support approximately twice the load.

Thus, to generally evenly balance the load distribution between the idler wheels 44 and 48 and the road wheels 46 and 50, the ratio of the longitudinal distance between the rotation axis of the road wheels and the rotation axis of the tandem frame, to the longitudinal distance between the rotation axis of the idler wheels and the rotation axis of the tandem frame should be approximately equal to the ratio of the diameter of the idler wheels to the diameter of the road wheels.

Understandably, other parameters (e.g. wheel width) could affect the relation between the longitudinal distances and the wheel diameters. In addition, one could choose particular distances and/or wheel diameters such as to change the load distribution.

Figure 3B:
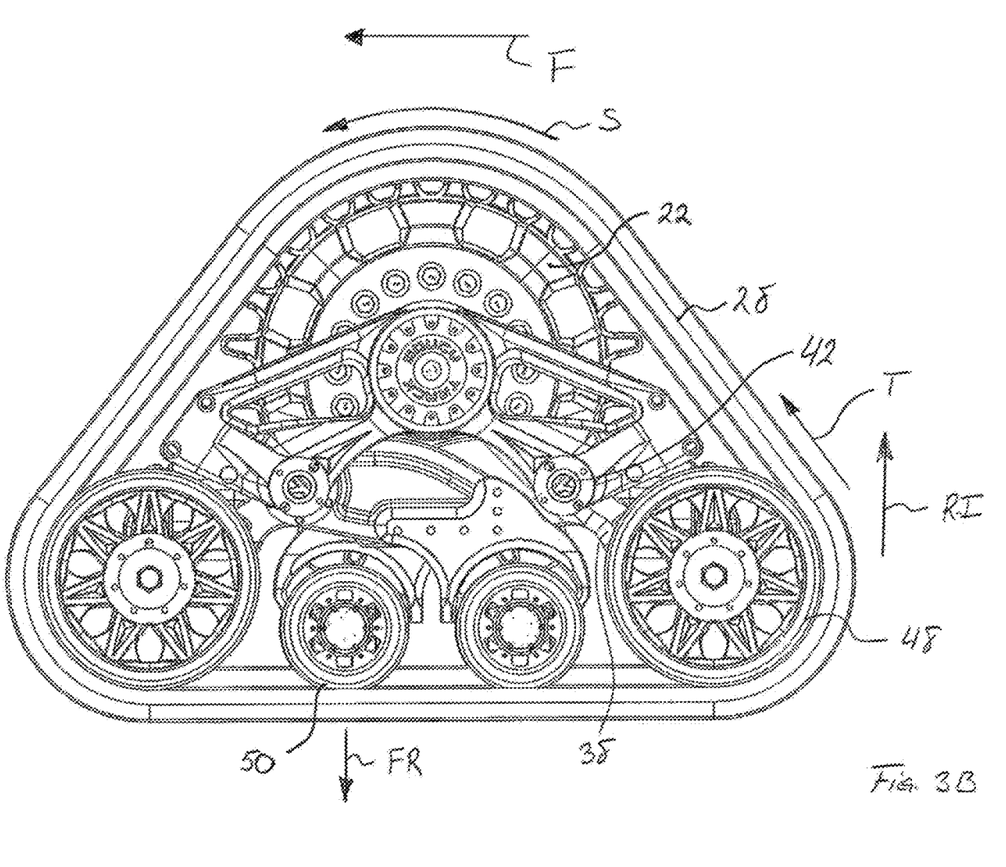
FIG. 3B is a side view of the track system of FIG. 2.

Referring now to FIG. 3B, when the track system 20 is operated such as to move in a forward direction, indicated by arrow F, the drive wheel 22 will rotate in a counter-clockwise direction as indicated by arrow S. The rotation of the drive wheel 22 will pull on the portion of the traction band 28 located behind the drive wheel 22. This pulling, indicated by arrow T, will impart an upward motion to the rear idler wheels 48 as indicated by arrow RI. Because of the pivotal connection of the rear tandem frame 38 to the frame assembly 34, the upward motion of the rear idler wheels 48 will cause an opposite downward motion of the front road wheels 50 as indicated by arrow FR.

However, as the longitudinal distance between the rotation axis 51 of the front road wheels 50 and the rotation axis 43 of the rear pivoting point 42 is larger than the longitudinal distance between the rotation axis 49 of the rear idler wheels 48 and the rotation axis 43 of the rear pivoting point 42, the downward motion of the front road wheels 50 will be countered, thereby limiting the upward motion of the rear idler wheels 48 and thus limiting the overall pivotal movement of the rear tandem frame 38. Indeed, the longer longitudinal distance between the rotation axis 51 of the front road wheels 50 and the rotation axis 43 of the rear pivoting point 42 creates a longer lever arm which can more easily counter the downward motion.

Furthermore, if the track system 20 then switches to be operated such as to move in a rearward direction, the drive wheel 22 will then rotate in a clockwise direction and the situation of FIG. 3B will be essentially reversed. However, as the pivotal motion of the rear tandem frame 38 was previously limited, the time required to pivot the rear tandem frame 38 back to its normal position will be reduced, thereby reducing the lag time when the track system 20 switches from moving in a forward direction to moving in a rearward direction, and vice-versa.

Understandably, frequent direction switching of the track system 20 can occur when the track system 20 is mounted to a vehicle, such as the front-loader shown in FIG. 1, which frequently switches direction during, for example, the handling of material.

Hence, limiting the rotation of the rear tandem frame 38 with respect to the pivoting point 42 is beneficial as it generally reduces lag time during direction switching and as it generally provides a more stable operation of the track system 20, and thus a more stable operation of the vehicle 10. Understandably, when the vehicle 10 is operated in reverse, the same principles apply to the front tandem frame 36 and its associated front idler wheels 44 and rear road wheels 46.

In the present embodiment, the rotation axis 51 of the front road wheels 50 is located longitudinally in front of the rotation axis 23 of the drive wheel 22. Symmetrically, the rotation axis 47 of the rear road wheels 46 is located longitudinally behind the rotation axis 23 of the drive wheel 22. In addition, in the present embodiment, the center of gravity of the traction system 20 is substantially vertically aligned with the rotation axis 23 of the drive wheel 22. Understandably, the relative position of the rotation axes of the idler wheels, of the road wheels and of the pivoting points with respect to the rotation axis 23 of the drive wheel 22 can further improve the load distribution and the load transfer between the idler wheels and road wheels during operation of the track system 20.

Figure 4:
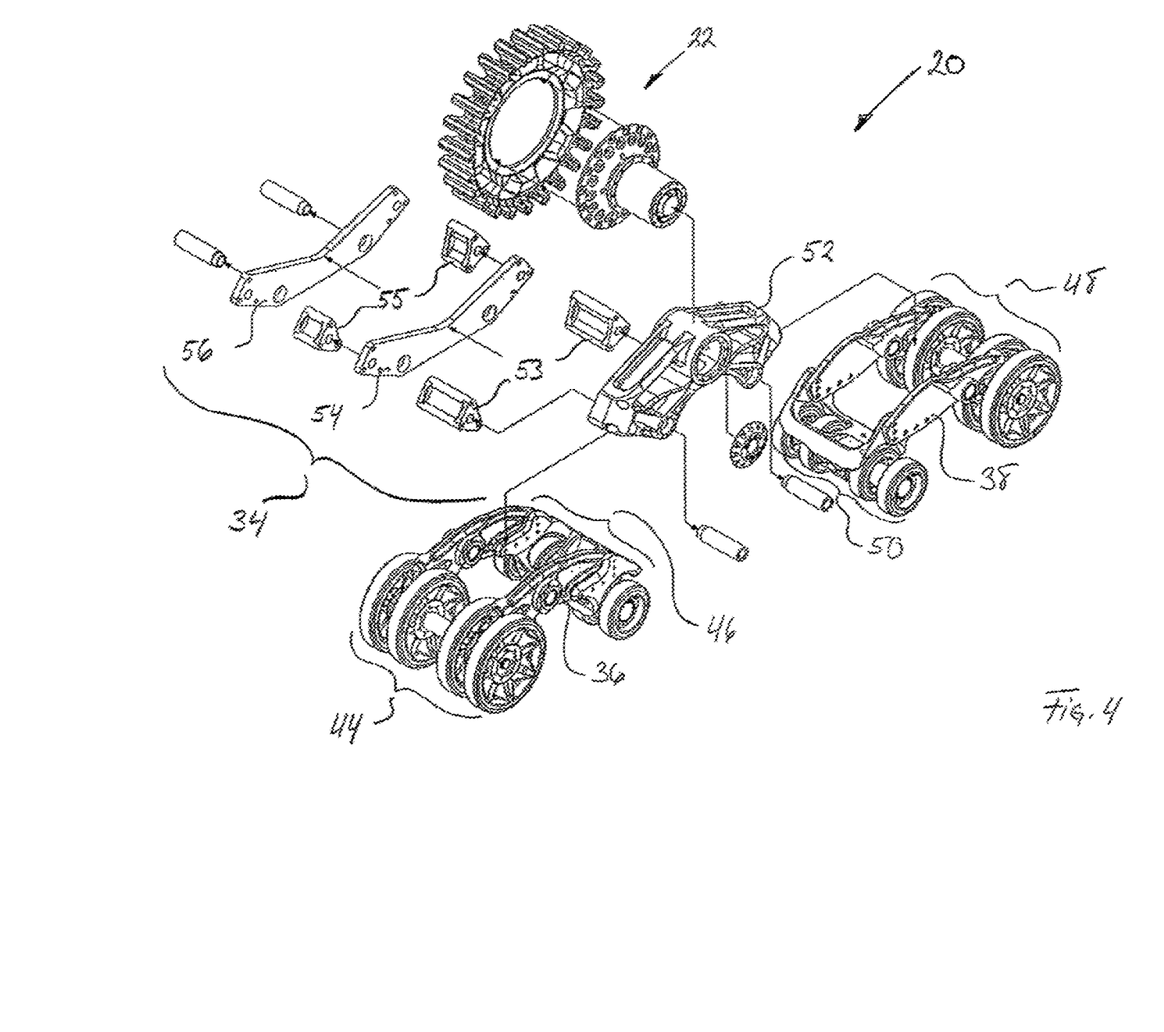
FIG. 4 is an exploded perspective view of the track system of FIG. 2, without the endless traction band.

Referring now to FIG. 4, an exploded view of the track system 20, without the traction band 28 is shown. Notably, in the present embodiment, the frame assembly 34 comprises frame members 52, 54 and 56 between which are mounted blockers or limiters 53 and 55. While the frame member 52 is located on the outer or outboard side of the drive wheel 22, the frame members 54 and 56, are located on the inner or inboard side of the drive wheel 22. Understandably, the frame assembly 34 normally behaves as a unitary structure. For their part, the limiters 53 and 55 limit the amplitude of the pivotal movements of the tandem frames 36 and 38 with respect to the frame assembly 34.

Figure 5:
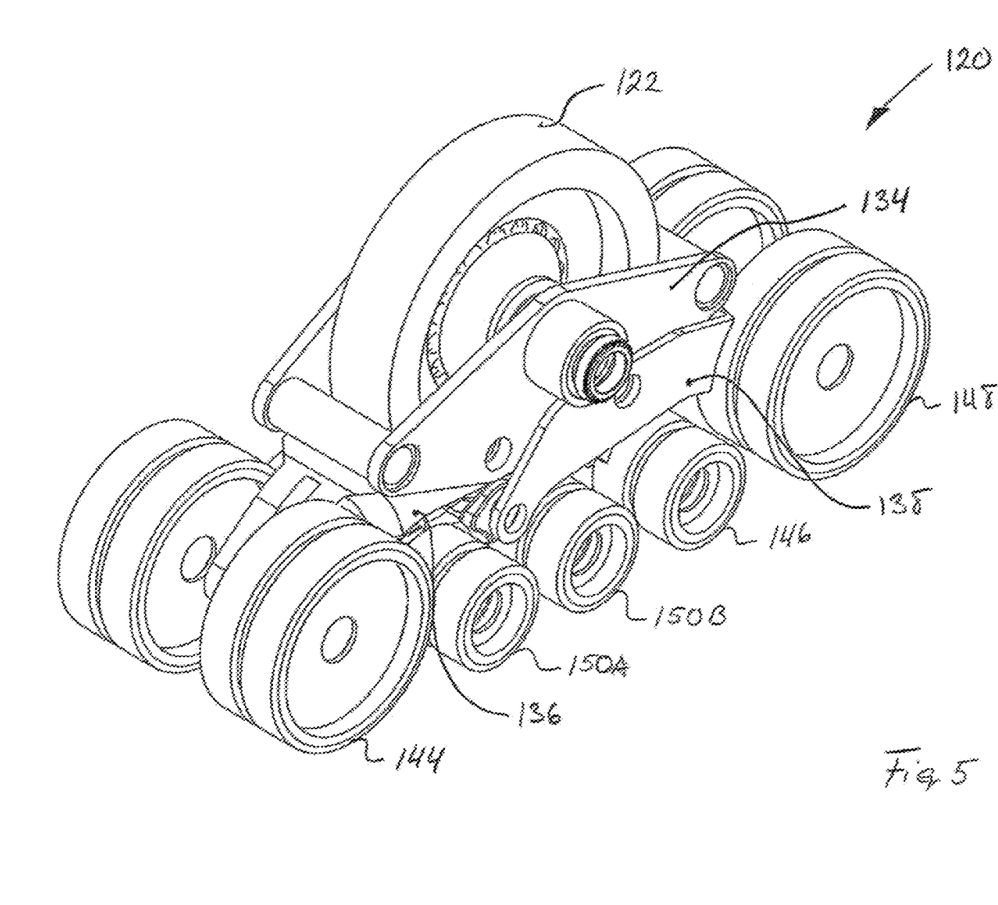
FIG. 5 is a perspective view of another embodiment of a track system in accordance with the principles to the present invention, without the endless traction band.
Figure 6:
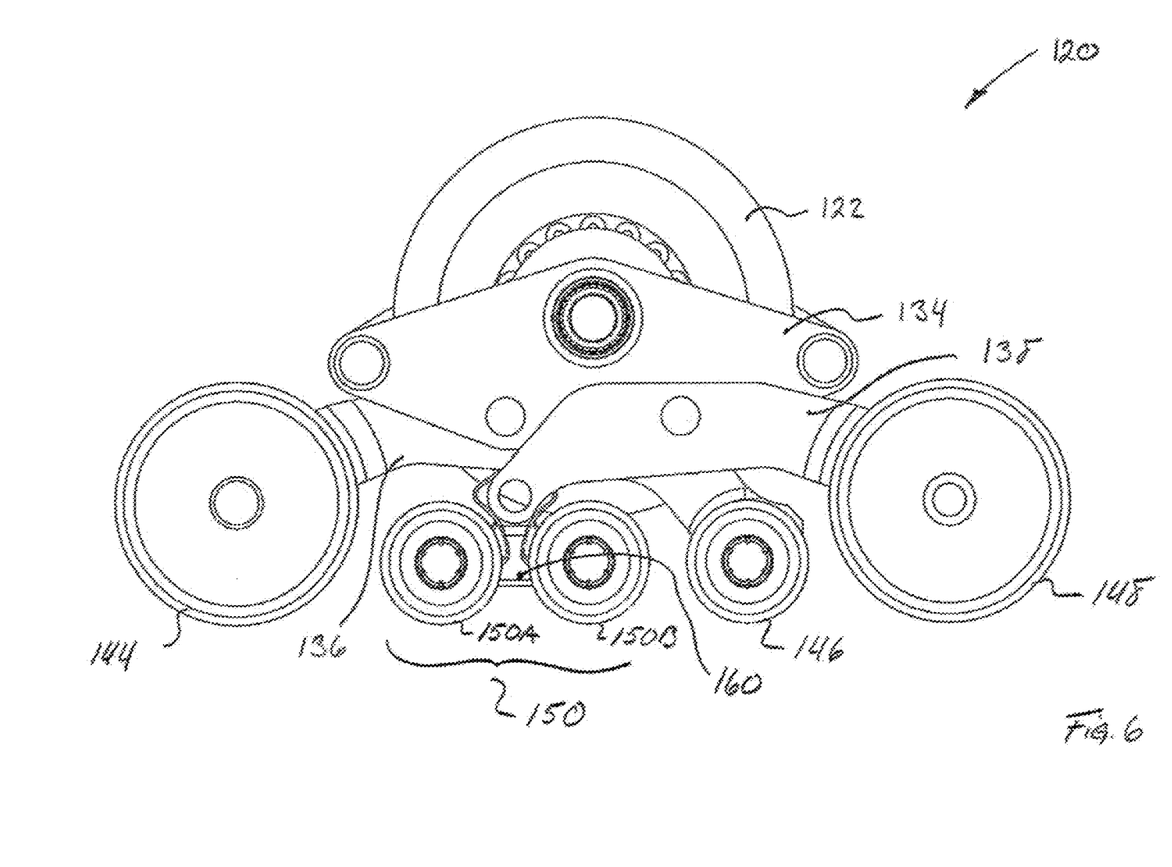
FIG. 6 is a side view of the track system of FIG. 5.

Referring now to FIGS. 5 and 6, another embodiment of a track system 120 made in accordance with the principles of the present invention is shown.

The track system 120 is broadly similar to track system 20 and therefore generally comprises a drive wheel 122, a frame assembly 134 pivotally mounted to the drive wheel 122, a front tandem frame 136 pivotally mounted to the frame assembly 134, a rear tandem frame 138 pivotally mounted to the frame assembly 134.

However, though the front tandem frame 136 is similar to the front tandem frame 36 in that it supports the front idler wheels 144 and the rear road wheels 146, the rear tandem frame 138 differs from the rear tandem frame 38 in that it further pivotally supports a tandem sub-frame 160 where the rear tandem frame 138 pivotally supports the front road wheels 150.

As best shown in FIG. 6, the tandem sub-frame 160 pivotally supports two sets of front road wheels 150, front road wheels 150A and front road wheels 150B. In other embodiments, there could be more than two sets of front road wheels 150.

The additional set or sets of road wheels can be used to support larger loads (e.g. heavier vehicles) and/or to provide a smoother ride. The additional set or sets of road wheels can also be beneficial when a longer track system is needed (e.g. for improved stability).

Understandably, depending on the exact configuration of the track system 120, the rear road wheels 146 could also be replaced by two or more sets of road wheels 146A and 146B mounted to a rear tandem sub-frame (not shown).

Figure 8:
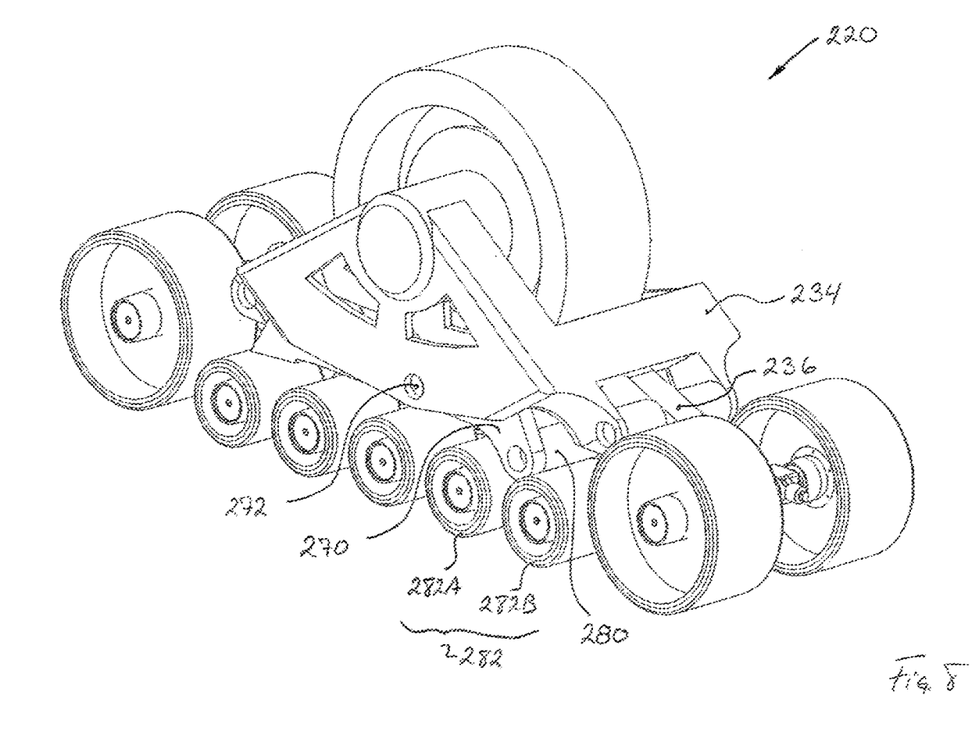
FIG. 8 is a perspective view of another embodiment of a track system in accordance with the principles to the present invention, without the endless traction band.
Figure 9:
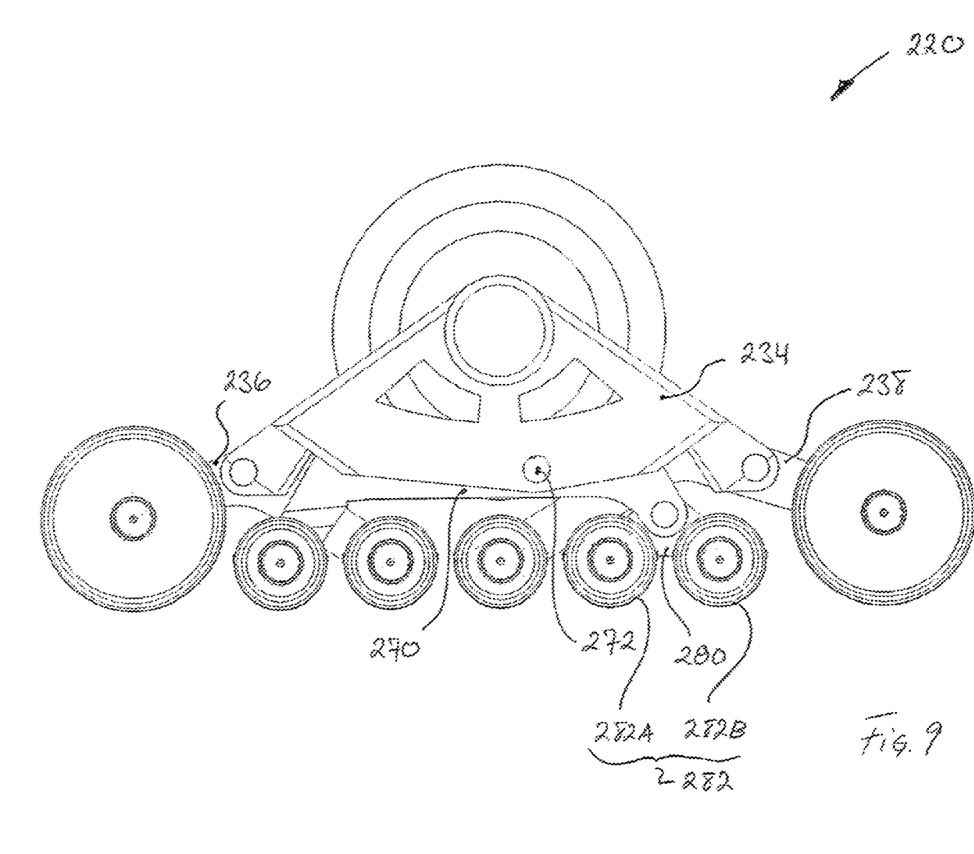
FIG. 9 is a side view of the track system of FIG. 8.

Referring to FIGS. 8 and 9, another embodiment of a track system 220 made in accordance with the principles of the present invention is shown.

The track system 220 differs from track systems 20 and 120 in that the front and rear tandem frames 236 and 238 are not directly overlapping. However, track system 220 comprises at least one additional intermediate tandem frame 270, pivotally mounted to the support frame assembly 234 at 272, which overlaps both the front and rear tandem frames 236 and 238.

Having one or more overlapping intermediate tandem frames, such as intermediate tandem frame 270, may be beneficial when, for example, longer track systems are required.

Understandably, as shown in track system 220, when more than two tandem frames are present, the front and rear tandem frames may not directly overlap. However, in accordance with the principles of the present invention and as shown in track system 220, when more than two tandem frames are present, adjacent tandem frames should generally be overlapping.

Still referring to FIGS. 8 and 9, in this embodiment, the intermediate tandem frame 270 further supports a tandem sub-frame 280, similar to the tandem sub-frame 160 of the embodiment of FIGS. 5 and 6. The tandem sub-frame 280 pivotally supports two sets of road wheels 282, road wheels 282A and 282B.

Understandably, depending on the exact configuration of the track system 220, the front, rear and intermediate tandem frames 236, 238 and 270 could all pivotally support tandem sub-frames if appropriate.

Understandably, the front and rear qualifiers used hereinabove are relative to the typically normal direction of movement of the track systems 20, 120 and 220 and have been use for ease of reference. However, the front and rear qualifiers should not be construed limitatively.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A track system for a vehicle, the track system comprising:
   a) a drive wheel configured to be mounted to the vehicle, the drive wheel having a drive wheel rotation axis;
   b) a support frame;
   c) a plurality of tandem frames pivotally mounted to the support frame, each of the tandem frames having a tandem frame rotation axis, the tandem frames comprising at least a first tandem frame pivotally supporting at least one first idler wheel and at least one first road wheel, and a second tandem frame pivotally supporting at least one second idler wheel and at least one second road wheel;
   d) a traction band disposed about the drive wheel, the at least one first idler wheel, the at least one second idler wheel, the at least one first road wheel, and the at least one second road wheel;
   wherein adjacent tandem frames are overlapping whereby the at least one first road wheel is located longitudinally between any of the wheels pivotally supported by the second tandem frame adjacent to the first tandem frame, and whereby said at least one second road wheel is located longitudinally between any of the wheels pivotally supported by the first tandem frame adjacent to the second tandem frame.

2. A track system as claimed in claim 1, wherein the tandem frame rotation axes are longitudinally spaced apart.

3. A track system as claimed in claim 2, wherein the drive wheel rotation axis is located longitudinally between the first tandem frame rotation axis and the second tandem frame rotation axis.

4. A track system as claimed in claim 1, wherein the at least one first idler wheel has a first idler wheel rotation axis, and wherein the at least one first road wheel has a first road wheel rotation axis.

5. A track system as claimed in claim 4, wherein a longitudinal distance between the first idler wheel rotation axis and the first tandem frame rotation axis is smaller than a longitudinal distance between the first tandem frame rotation axis and the first road wheel rotation axis.

6. A track system as claimed in claim 5, wherein the at least one first idler wheel has a first idler wheel diameter, and wherein the at least one first road wheel has a first road wheel diameter, the first idler wheel diameter being larger than the first road wheel diameter.

7. A track system as claimed in claim 1, wherein the at least one second idler wheel has a second idler wheel rotation axis, and wherein the at least one second road wheel has a second road wheel rotation axis.

8. A track system as claimed in claim 7, wherein a longitudinal distance between the second idler wheel rotation axis and the second tandem frame rotation axis is smaller than a longitudinal distance between the second tandem frame rotation axis and the second road wheel rotation axis.

9. A track system as claimed in claim 8, wherein the at least one second idler wheel has a second idler wheel diameter, and wherein the at least one second road wheel has a second road wheel diameter, the second idler wheel diameter being larger than the second road wheel diameter.

10. A track system as claimed in claim 1, wherein the tandem frames comprise at least a third tandem frame pivotally supporting at least one third road wheel and at least one fourth road wheel.

11. A track system as claimed in claim 10, wherein the third tandem frame rotation axis is located longitudinally between the first tandem frame rotation axis and the second tandem frame rotation axis.

12. A track system as claimed in claim 1, wherein the at least one first idler wheel comprises a plurality of first idler wheels, wherein the at least one first road wheel comprises a plurality of first road wheels, wherein the at least one second idler wheel comprises a plurality of second idler wheels, and wherein the at least one second road wheel comprises a plurality of second road wheels.

13. A track system as claimed in claim 1, wherein at least one of the tandem frames comprises at least one tandem sub-frame pivotally mounted to the at least one of the tandem frames, the at least one tandem sub-frame pivotally supporting at least two road wheels.

14. A track system as claimed in claim 1, wherein the support frame is pivotally mounted to the drive wheel.

15. A track system as claimed in claim 1, wherein the support frame is configured to be mounted to the vehicle.

16. A track system as claimed in claim 1, wherein the first tandem frame is the front tandem frame, wherein the second tandem frame is the rear tandem frame, wherein the at least one first idler wheel is the at least one front idler wheel, and wherein the at least one second idler wheel is the at least one rear idler wheel.

17. A vehicle having mounted thereto at least one track system as claimed in claim 1.

18. A track system for a vehicle, the track system comprising:
   a) a drive wheel configured to be mounted to the vehicle, the drive wheel having a drive wheel rotation axis;
   b) a support frame;
   c) a plurality of tandem frames pivotally mounted to the support frame, each of the tandem frames having a tandem frame rotation axis, the tandem frames comprising at least a first tandem frame pivotally supporting at least one first idler wheel and at least one first road wheel, and a second tandem frame pivotally supporting at least one second idler wheel and at least one second road wheel;
   d) a third tandem frame pivotally supporting at least one third road wheel and at least one fourth road wheel;
   e) a traction band disposed about the drive wheel, the at least one first idler wheel, the at least one second idler wheel, the at least one first road wheel, and the at least one second road wheel;
      wherein adjacent tandem frames are overlapping whereby the at least one first road wheel is located longitudinally between at least one of the third and fourth road wheels pivotally supported by the third tandem frame adjacent to the first tandem frame, and whereby said at least one second road wheel is located longitudinally between at least one of the third and fourth road wheels pivotally supported by the third tandem frame adjacent to the second tandem frame.

19. A track system as claimed in claim 18, wherein the third tandem frame rotation axis is located longitudinally between the first tandem frame rotation axis and the second tandem frame rotation axis.

20. A track system as claimed in claim 18, wherein at least one of the tandem frames comprises at least one tandem sub-frame pivotally mounted to the at least one of the tandem frames, the at least one tandem sub-frame pivotally supporting at least two road wheels.

\* \* \* \* \*